United States Patent [19]
Roden et al.

[11] Patent Number: 5,906,856
[45] Date of Patent: *May 25, 1999

[54] PROCESS FOR THE PREPARATION OF A LOW-CALORIE, LIQUID BUTTER SUBSTITUTE

[75] Inventors: Allan D Roden, Nobelsville; Leslie M Snyder, Indianapolis; Turiddu A Pelloso, Carmel, all of Ind.

[73] Assignee: ConAgra, Inc., Omaha, Nebr.

[*] Notice: This patent issued on a continued prosecution application filed under 37 CFR 1.53(d), and is subject to the twenty year patent term provisions of 35 U.S.C. 154(a)(2).

[21] Appl. No.: 08/785,937

[22] Filed: Jan. 22, 1997

Related U.S. Application Data

[63] Continuation-in-part of application No. 08/506,284, Jul. 24, 1995, abandoned.

[51] Int. Cl.$^6$ .................................................. A23D 7/015
[52] U.S. Cl. .......................... 426/603; 426/72; 426/119; 426/518; 426/575; 426/576; 426/577; 426/613; 426/804
[58] Field of Search ............................. 426/72, 603, 575, 426/576, 577, 613, 518, 119, 804

[56] References Cited

U.S. PATENT DOCUMENTS

| | | | |
|---|---|---|---|
| 3,600,186 | 8/1971 | Mattson et al. ................................ | 99/1 |
| 4,103,037 | 7/1978 | Bodor et al. ............................... | 426/575 |
| 4,468,408 | 8/1984 | Basco et al. ............................... | 426/604 |
| 4,828,396 | 5/1989 | Singer et al. ............................. | 366/149 |
| 4,832,975 | 5/1989 | Yang ....................................... | 426/607 |
| 4,917,915 | 4/1990 | Cain et al. ................................ | 426/573 |
| 5,082,684 | 1/1992 | Fung ........................................ | 426/602 |
| 5,158,798 | 10/1992 | Fung et al. ................................ | 426/602 |
| 5,258,197 | 11/1993 | Wheeler et al. ........................... | 426/607 |
| 5,324,531 | 6/1994 | Hoefler et al. ............................ | 426/573 |
| 5,338,561 | 8/1994 | Campbell et al. ......................... | 426/602 |
| 5,338,562 | 8/1994 | Humphreys ............................... | 426/603 |
| 5,593,716 | 1/1997 | Appleqvist et al. ...................... | 426/603 |

FOREIGN PATENT DOCUMENTS 233856  8/1987  European Pat. Off. .

OTHER PUBLICATIONS

Mead J., et al, Lipids, Plenum, NY 1986, p. 459.
Beare–Rogers J., ed., Dietary Fat Requirements in Health and Development, AOCS 1988, pp. 107–119.

*Primary Examiner*—Helen Pratt
*Attorney, Agent, or Firm*—Pretty Schroeder & Poplawski

[57] ABSTRACT

A liquid butter replacement exhibits a pleasant fat-like mouth feel despite a very low or no fat content, good color, good flavor, and a degree of fat-like melt without causing toast or other similar substrate to which the product is applied to become soggy due to moisture release. A flowable fat mimetic is prepared from an aqueous solution comprising a cross-linkable carbohydrate gelling composition (preferably pectin) and at least one gelling agent (preferably a calcium salt) that together form a heat-stable inner gelled phase which is agitated to produce gel particles that provide an organoleptic sensation similar to fat. The weight of the fat mimetic is at least about 75% of the weight of the butter substitute. The flowable fat mimetic is then combined with an second, continuous outer phase containing an unhydrated heat-reversible or heat-thinning, water-soluble gelling agent, and preferably salt and milk or milk solids. The product so formed exhibits good melting properties, little syneresis and maximal flavor impact similar to a full fat margarine, but with little or no fat.

19 Claims, 2 Drawing Sheets

5,906,856

PROCESS FOR THE PREPARATION OF A LOW-CALORIE, LIQUID BUTTER SUBSTITUTE

RELATED APPLICATION DATA

This is a continuation-in-part of application U.S. Ser. No. 08/506,284, filed Jul. 24, 1995, now abandoned which is hereby incorporated herein in its entirety by reference.

TECHNICAL FIELD

The invention relates to an improved liquid butter substitute and a process for its preparation, and particularly to butter substitutes having little or no fat.

The flavor of butter is so well liked in recipes enjoyed by such a broad spectrum of people, spanning many cultures, that it is difficult to conceive of a diet in which it is entirely eliminated. Unfortunately, that is exactly what some health professionals are advocating for many individuals. For others, the general recommendation is to reduce the intake of all fat, including butter and margarine. In an effort to provide products more acceptable from the standpoint of fat content, some manufacturers have provided reduced-fat spreads—some of these in liquid form.

Typical reduced fat spreads do not give the same flavor and enjoyment offered by butter. There are many reasons for this, beyond the obvious one that it is always difficult to simulate a natural product when the intent is to significantly change it. The fat content of butter is not only important because it provides the desired melt character, but it also is a carrier for the fat-soluble flavors which are so important to butter. Attempts to make liquid, butter-simulating spreads has been typified by the presence of large amounts of water which is released on heating—causing starch-based substrates to become soggy—and the provision of some degree of melt (like natural butter) exacerbates the problem. Moreover, these spreads tend to have microbiological problems unless amounts of preservatives are employed which can affect the flavor, and maintenance of a good color is also difficult.

There is a need for a method which will facilitate the preparation and packaging of a liquid butter substitute formulated and processed in such a way to insure microbiological stability, and to provide good flavor, color, and a pourable or squeezable consistency which exhibits a perceivable melt quality when applied to hot foods, but which does not sog the substrate.

BACKGROUND ART

The art of preparing low-calorie butter substitutes and margarine-like spreads has focused on the removal of fat since fat (in both solid and liquid form, i.e., fats and oils) comprises a major amount of the weight of these products—typically about 80 to about 85% by weight.

Dietary fat is high in calories. It is the most concentrated source of energy of all the nutrients, supplying 9 kcal/gram, about double that contributed by either carbohydrate or protein. The amount of fat in the American diet has increased in the last 60 years by about 25% (Mead, J., et al., *Lipids*, Plenum, New York, 1986, page 459; this and other references cited hereafter are hereby incorporated herein by reference), so that fats now provide approximately 34% (or more, by some estimates) of the daily caloric intake.

Because fats are high in calories and because some fats have been associated with health risks when consumed in large quantities over time, a number of national advisory committees on nutrition have recommended that the total amount of fat in the diet be reduced significantly (Gottenbos, J.J., chapter 8 in Beare-Rogers, J., ed., *Dietary Fat Requirements in Health and Development*, A.O.C.S. 1988, page 109).

The fat component of butter substitutes has been reduced in a variety of ways—in each case adding something to compensate for the weight and volume of the fat eliminated. This has been achieved with various degrees of success by emulsifying with more water, using gelling or thickening agents to bind added water, adding discrete small particles which give the sensation of fat in the mouth, and using synthetic fats to replace the natural ones.

The use of synthetic fats is often more expensive than is justified commercially. Moreover, fat replacements which are based on wholly non-digestible oily materials, such as sucrose polyesters (see, for example Mattson, et al., U.S. Pat. No. 3,600,186), have a tendency to pass through the digestive tract intact. Unless something is done to physically bind them to other food components, they are excreted in essentially the form in which they are introduced. The liquid products of this type have been known to be the subjects of frank anal discharge. The preparation of liquid butter substitutes using products of this type has complications beyond mere cost.

Emulsions that use more water and less fat, essentially stretch the fat structure of the water-in-oil emulsions. This technique, by decreasing the amount of fat available to enclose the water, has stability limits. Moreover, the water tends to release from the emulsion when the fat melts, and it tends to undesirably wet starch-based substrates such as bread, muffins, cakes and crackers. When used as a topping on vegetables, the melted phase has poor cling, and water and other ingredients tend to pool under the food to which the topping is applied, thus not providing the desired flavor and appearance for the consumer.

Other patent disclosures suggest using a gelling agent such as gelatin or agar (see, for example, U.S. Pat. No. 4,103,800, to Bodor, et al.) or maltodextrin (e.g., U.S. Pat. No. 4,917,915, to Cain, et al.) to thicken the water phases in these water-in-oil emulsions and prevent them from flowing until melt occurs in the mouth. However, melting on hot toast or the like will also release the water and make the toast soggy. Also the gelling agents add a paste-like taste to the product. If the amount of gelling agents is increased sufficiently to overcome the melting problem, then the pasty impression of the product is increased.

In the case of oil-in-water emulsions, Bosco and Sledzieski, disclosed in U.S. Pat. No. 4,468,408, that a liquid spread could be made having less than 30% fat. They taught the use of a combination of an emulsion stabilizer and an emulsifier system which included both a lipophilic and a hydrophilic emulsifier. The emulsion stabilizer could be a gelling gum, but at a level below the amount needed to gel all of the liquid.

Recently, a number of techniques have been proposed for creating dispersions of gelled or coagulated materials to simulate a fat emulsion or cream. Among these are U.S. Pat. No. 4,828,396, to Singer, et al., wherein the use of spheroidal particles of less than two microns was asserted to have a fatty character. Similarly, in U.S. Pat. No. 5,338,561, to Campbell, et al, it is disclosed that gelling carbohydrates can be sheared into fine particles during gelling to provide a thermally reversible gel exhibiting a fat-like mouth feel. Campbell, et al., farther indicate that thickeners can be added to the resulting cream in some embodiments, but it is not required as the first phase is thin due to the shearing step. Because the gel is thermally reversible, however, it loses its water on heating, so the emulsions are disclosed as useful for non-dairy creams, dressings, mayonnaises and the like, and not products applied to hot substrates. Moreover, the product must be packed at low temperatures under aseptic processing conditions. In addition, applications of this type of product under conditions where thermal cycling occurs have resulted in an undesirable consistency due to melting and regelling. This problem is also encountered during product distribution and storage if warming occurs.

In U.S. Pat. No. 5,324,531, Hoefler, et al., prepare a fat-simulating composition composed of shredded and hydrated carbohydrate gel particles that are elongated and irregularly-shaped and of a certain size, with the longest axial dimension of up to about 250 microns and a mean volume diameter of from about 10 to about 100 microns. The product, currently marketed under the tradename Slendid®, is prepared by mixing a carbohydrate with water to form a gel and then chopping and shearing the gel into particles. In order for the gel particles to stay unchanged on storage, the water activities of the carbohydrate making up the gel paticles and the water phase of the food product in which the particles are a component have to be comparable. Alone, the product has a paste-like consistency and taste with no melting or flow in the mouth, and gels made with the composition will weep water on long-term storage unless special precautions are taken. If prepared at lower concentrations to avoid the paste-like consistency, the product's viscosity is too thin, resulting in a product that looks like slime.

U.S. Pat. No. 5,082,684 to Fung and U.S. Pat. No. 5,158,798 to Fung, et al., disclose fat substitutes formed by adding a gel-forming composition to an aqueous phase to form a non-pourable water phase, which is then added to an oil phase to form a product that is pourable.

Fat mimetics based on carbohydrates and proteins are advantageous because they have less than half the caloric density of typical triglyceride margarine fats and are employed at less than a one-to-one basis (due to water of hydration). Fat is not, however, without benefits unique to itself, and desirable low-fat spreads retain these. Fat contributes—sometimes greatly—to the palatability and flavor of food, since most food flavors are fat-soluble. Fat is also important as a carrier of the fat-soluble vitamins, A, D, E, and K. Water-soluble flavors and salt tend to concentrate in the aqueous phase and it is typical to also retain an aqueous phase which provides good release of these components. As the water phase is only 20% in margarine, the high concentration of flavor and salt in that phase provides a pleasing mouth sensation. In lower fat products, the water phase is diluted, and flavor benefit is lost. Whenever an aqueous phase is employed, it is necessary to provide a preservative to protect against microbiological growth and spoilage.

Despite the development of a wide variety of fat substitutes and butter replacements taught by the art and available on the market, there remains a need for a liquid butter replacement which has—in addition to a pleasant fat-like mouth feel despite a very low or no fat content—good color, good flavor impact from both buttery and salty flavors, a high water content without problems of flavor or microbiological stability, and a degree of fat-like melt without causing toast or other similar substrate to to which it is applied to become soggy due to moisture release.

BRIEF DESCRIPTION OF THE DRAWINGS

The invention will be better understood and its advantages will be better appreciated from the following detailed description, especially when read in connection with the accompanying drawings, wherein.

DISCLOSURE OF THE INVENTION

Figure 1:
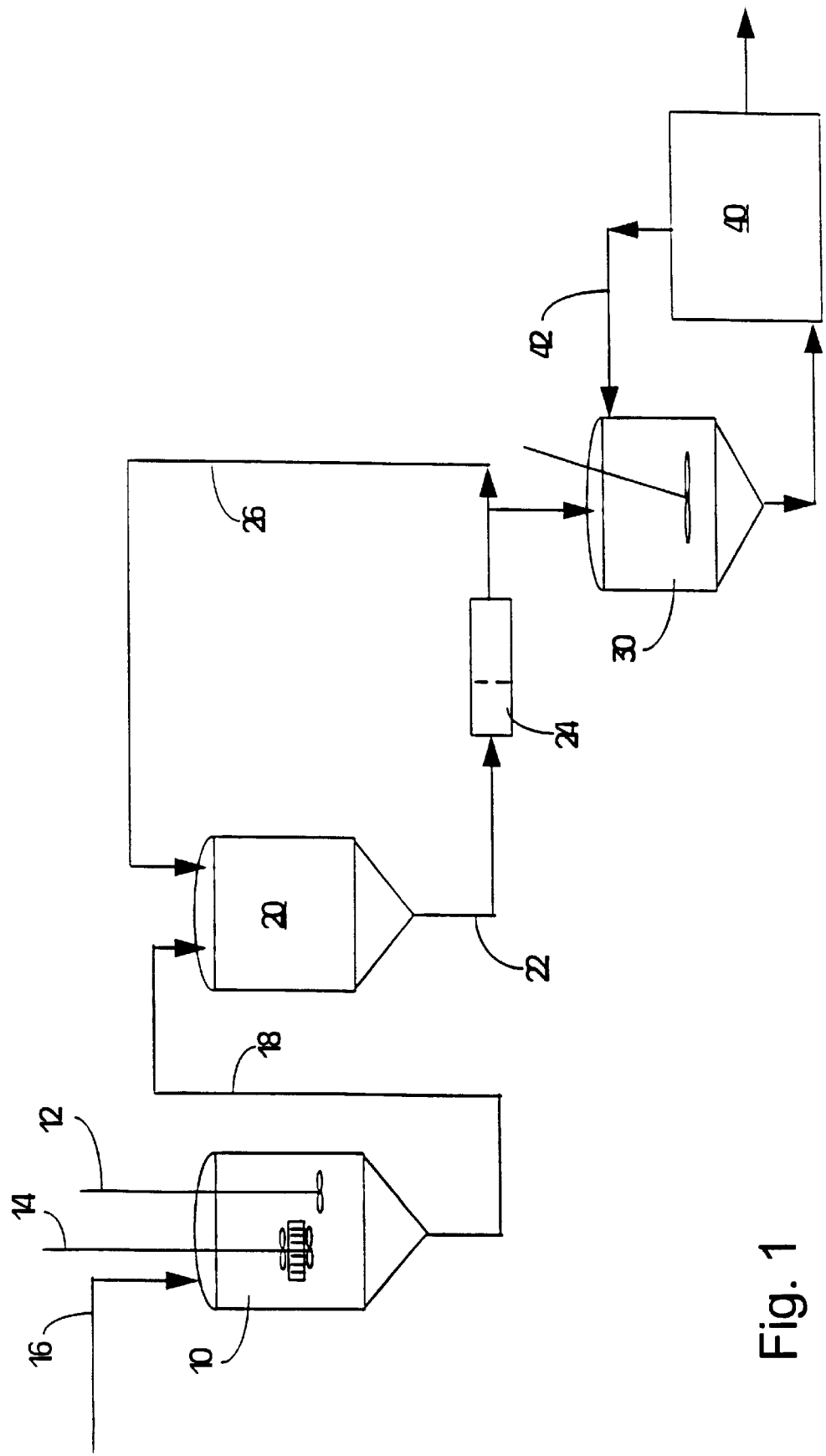
FIG. 1 is a schematic representation of a process according to the present invention.

It is an object of the invention to provide an improved liquid spread or topping having little or no fat and a process for its preparation, wherein the product and process are improved by utilizing both the techniques and formulations described below.

It is another object of the invention to provide a process which will facilitate the preparation of a liquid butter substitute having good microbiological stability, good flavor and color, and a pourable or squeezable consistency which exhibits a perceivable melt quality which, when applied to hot foods, will not release moisture and sog the substrate.

It is also an object of the invention to provide a liquid butter substitute having good microbiological stability. This is accomplished by providing a process that aids in the packaging of the product and processing that mimics full-fat products.

Another object of the invention is to provide a product exhibiting good flavor and color, and a pourable or squeezable consistency which exhibits little or no syneresis on long-term storage.

It is yet another and more specific object of the invention to provide an improved liquid butter replacement which has—in addition to a pleasant fat-like mouth feel despite a very low or no fat content—good color, good flavor, and a degree of fat-like melt without causing toast or other similar substrate to which it is applied to become soggy due to moisture release.

These and other objects are realized by the present invention which provides both improved products and processes for their preparation.

In one form of the invention, as shown in the attached drawings, the process will comprise: blending an aqueous solution comprising a heat-stable, cross-linkable gelling composition and at least one gelling agent in an amount sufficient to cross-link the solution to form a self-sustaining, heat-stable gel, the weight of the gelled solution being at least about 75% to about 99% of the weight of the final product; agitating the solution containing the gelling agent sufficiently to reduce the gel to a flowable fat mimetic comprised of particles that provide an organoleptic sensation similar to fat; and, providing the flowable fat mimetic with a second, outer phase containing a heat-reversible or heat-thinning, water-soluble gelling agent, the second, outer phase comprising from about 1% to about 25% of the weight of the final product. The products formed in this manner have particular utility as flowable butter substitutes.

In its broad aspects, the flowable products (preferably, butter substitutes) of the invention contain 0 to 15%, preferably less than 3%, fat, and comprise two phases: a flowable fat mimetic comprised of heat-stable particles that provide an organoleptic sensation similar to fat, wherein the fat mimetic comprises from about 75 to about 99% of weight of the product; and, a second, outer phase containing a heat-reversible, water-soluble gelling agent, the second, outer phase comprising from about 1% to about 25% of the weight of the product. In typical embodiments, salt and flavors such as milk solids are components of the second, outer phase.

The unique combination of two phases formulated and processed as described below results in a product that mimics conventional margarine but contains little or no fat. The large proportion of gelled non-thermally reversible inner phase is analogous to the fat phase of a margarine. When consumed or applied to a hot substrate, the product gives the appearance of melting like that observed when the fat phase of margarine melts, but the particles actually do not melt. Instead, water weeps into the outer phase. This utilization of inner phase syneresis controls syneresis of the overall product.

Functioning in a manner analogous to the aqueous phase of a margarine, the outer phase contains salt and flavors. This concentration maximizes flavor impact. It also provides microbiological stability in the phase, and protects the inner phase. To enhance microbiological stability of the overall product, a preservative can be added to the inner phase without affecting the flavor of the product. In this respect, the product can be formulated to mimic the microbiological resistance of a margarine. In addition, the process of making a product of the invention removes the need for scraped-surface heat exchangers during manufacture.

Many of the preferred aspects of the invention are described below.

Industrial Applicability

This invention is based upon the finding that choice of a dual gelling system comprising a heat-stable gel in an inner aqueous phase and a thermally reversible or thermally-thinning gel in an outer phase, special processing and the order of ingredient addition result in a liquid butter substitute exhibiting minimal syneresis even when stored for long periods or applied to a hot substrate.

The description which follows centers on the processing of a preferred butter substitute product, using the preferred processing scheme as illustrated in the accompanying drawings. It will be understood, however, that other formulations and equipment can be employed.

The preferred products are butter-flavored. The term "butter-flavored" is meant to include compositions flavored to simulate butter by both naturally-derived and simulated butter flavors. This term is used in its literal sense and is not meant to be otherwise restricted. A composition is considered "butter-flavored" when an expert panel trained to evaluate flavors of this type characterizes the product as "buttery" or "butter-like" in flavor. The process of the invention can also be used to prepare products which can substitute for butter, such as certain toppings for potatoes and the like, but which do not have a distinct butter flavor.

Reference is now made to FIG. 1 to aid in describing a preferred process scheme according to the invention. The drawing shows mix tank 10, typically of stainless steel. Tank 10 is shown fitted with both an agitator 12 and an in-tank homogenizer 14. The agitator 12 maintains the tank ingredients in constant agitation. The homogenizer 14 is used to shear an irreversible carbohydrate gel into irregular pieces in the tank as it is formed. This will be explained in greater detail below. Among the suitable homogenizers for this purpose are those having a rotor with a plurality of blades extending radially from a rotary shaft, the rotor being surrounded by a slotted cylindrical cage, called a stator, through which the medium being homogenized is impelled and cut. These are available from a number of sources such as Admix and Urschel.

The mix tank 10 is used initially to prepare a fat mimetic component and then to blend that component of the composition of the invention with a separate second, outer phase.

The composition will contain less than about 25% of the second, outer phase, typically from about 5 to about 10% of the weight of the total butter substitute composition. If the butter substitute composition contains any fat, it is preferably formulated to be in the second, outer phase. Typical compositions contain less than about 15%, and preferably less than about 5%, most preferably from about 0% to 3.5%, fat. The purpose of adding fat to compositions of the invention is to provide a carrier for fat-soluble vitamins, colors, and flavors to the extent desired, and not to form a functional oil phase. Where fat is included, the amount of fat is, in preferred embodiments, just sufficient to incorporate sufficient fat-soluble color to provide a good simulation of butter color to the butter substitute composition and/or to solubilize vitamins.

The products of the invention will most closely simulate butter and margarine when they are suitably colored with those materials known to the art for this purpose. Examples of coloring agents are beta-carotene, annatto, and FD&C dyes. Fat-soluble colors are typically dissolved or dispersed in a fat or oil prior to adding them to the second, outer phase to expedite blending and to assure uniformity in the final product. In fat-free embodiments, water-soluble colors such as turmeric, paprika, or colored whey are typically added to the second aqueous phase prior to blending with the first. An example is given hereafter.

The term "fat" as used herein is intended to include all edible, fatty acid triglycerides regardless of origin or whether they are solid or liquid at room temperature. Thus, the term "fat" includes normally liquid and normally solid vegetable oils and animal fats. Typical of the vegetable oils which are included are the usual vegetable oils such as corn oil, canola oil, coconut oil, cottonseed oil, peanut oil, palm oil, palm kernel oil, soybean oil, safflower oil, sunflower oil, and rapeseed oil. The preferred fats for use in embodiments of the invention containing fat will comprise a liquid oil. Most preferably, the oil will be selected from the group consisting of soybean oil, corn oil, cottonseed oil, peanut oil, coconut oil, palm oil, palm kernel oil, olive oil, safflower oil, sunflower oil, rapeseed oil, and mixtures and fractions of these. Also suitable are animal-derived fats such as fish oil, tallow, lard, poultry fat, and the like, and mixtures and fractions of these. In addition, low-calorie fatty esters such as structured glycerides and sugar esters (such as those available under the trademarks OLESTRA and SALATRIM) can be employed, as disclosed, for example in U.S. Pat. No. 3,600,186, U.S. Pat. No. 4,832,975, U.S. Pat. No. 5,258,197, and European Patent Application No. 233,856, and the references cited in these.

The liquid butter substitute of the invention has a very low fat content or is fat-free and a very high water content. These factors necessitate the use of preservatives to control the proliferation of microorganisms during storage. It is an advantage of the preferred form of the invention that the preservatives are added to the fat mimetic portion to suppress their flavor without diminishing their effectiveness. Without wishing to be limited to any theory, this works because the ingredients become bound up in the gel, and are thus less available. Among the preservative compositions, are those effective to maintain stability against microbiological and oxidative deterioration. To control mold and yeast growth, the products desirably contain one or more preservatives such as benzoic acid, sorbic acid, phosphoric acid, lactic acid, citric acid and ethylenediaminetetraacetic acid (EDTA) and the soluble salts of these and other like materials. Preferred as anti-microbials are potassium sorbate, sodium sorbate, potassium benzoate, sodium benzoate, calcium lactate and phosphoric acid. Stability against oxidative deterioration may be obtained by the use of the usual anti-oxidants, typical among which are normal propyl gallate, the several tocopherols, butylated hydroxy anisole (BHA), butylated hydroxy toluene (BHT), nordihydroguaiaretic acid (NDGA), tertiary-butylhydroquinon (TBHQ), citric acid and ethylenediaminetetraacetic acid (EDTA). As will be discussed in greater detail below, the high salt content of the outer phase protects it from microbial growth, and, by virtue of product structure, helps protect the inner phase from contamination.

As initial steps in the process, it is preferred in some embodiments to prepare two premixes to facilitate blending of the principal components in the mix tank 10—one is an "oil or aqueous color premix" and the other, a "calcium premix". The oil premix will typically contain substantially all of the oil or fat employed in the composition, e.g., oil-soluble flavors and/or colors in an oil carrier if oil is employed. The calcium premix will contain the preferred calcium salts (or their equivalents) which are used as gelling agents to prepare the fat mimetic in the inner phase by gelling the cross-linkable carbohydrate, such as pectin or equivalent. Among the preferred gelling agents are calcium chloride, calcium lactate, calcium carbonate, and other calcium salts suitable for food use, including the calcium salts of the typical food acids such as citric, fumaric, adipic, malic, and the like. The mixing of each of these premixes is straight forward, simply entailing adding the liquid components first and then the solids, and is not shown in the drawings.

Among the suitable cross-linkable carbohydrates and gelling agents are those identified in U.S. Pat. No. 5,324,531, the disclosure of which is incorporated by reference in its entirety. Preferred cross-linkable gelling agents are carbohydrates, including any member selected from the group consisting of pectins, pectates, alginates, agar-agar, konjac, gellan gum, kappa carrageenan, iota carrageenan, and mixtures of any of these. Preferred cross-linkable gelling agents are pectin mixtures including both low-methoxyl pectins (e.g., containing 200 to 1000 galacturonic acid units linked by $\alpha$-1,4-glucosidic bonds, wherein less than 50% of the galacturonic groups are esterified with methyl groups) and high-methoxyl pectins (e.g., similar to the low-methoxyl pectins, but with a different, higher degree of esterification).

Referring again to FIG. 1, water is fed to the mix tank 10 via line 16, preferably after filtering (e.g., through a charcoal filter), and heating, preferably to a temperature of at least 180° F. At this point, the agitator is started and the preservatives (e.g., EDTA, sorbate, benzoate, and lactic acid to a titratable acidity of from about 0.20 to about 0.35). The EDTA is useful to chelate any free calcium or other hardness factors in the water which would interfere with the pectin or other cross-inkable gelling composition. At this point, the in-tank homogenizer is started and the pectin or other cross-linkable gelling composition is added, typically in dry form. The combined ingredients are then mixed for from about 1 to 10 minutes or as is necessary to fully hydrate the pectin, e.g. for about eight minutes, before adding the calcium premix. The combined ingredients are then continuously mixed by the in-tank homogenizer for a sufficient time to give the mixture the consistency of apple sauce, e.g., containing visible particulates and a grainy texture visually and tactily. The resulting composition is a flowable (that is, it does not retain its shape when placed on a surface in a cylindrical portion 1 cm high and 1 cm in diameter) fat mimetic comprised of particles that provide an organoleptic sensation similar to fat.

This fat mimetic is then blended with the ingredients for a second, outer aqueous phase which preferably provides, as noted above, the principal source of color, flavor, and fat-like melt. This phase is also the principal source of fat, if present, and contains sufficient salt to act as a preservative for all water added (preferably, none is added) or which works its way from the fat mimetic phase to the second, outer phase by syneresis. The second, outer phase will comprise no more than 25% of the weight of the total product, e.g., butter substitute composition, and preferably will comprise from about 1% to about 10% of it.

The second, outer phase is intended to be the principal source of flavor for the composition despite its presence in such minor amounts of the total butter substitute composition. It is also the principal source of salt. In preferred embodiments, salt is added in an amount sufficient to provide the flavor and microstability of a margarine containing 80% fat. By providing the flavor to this phase, apart from the principal amounts of preservatives in the preferred formulations, a cleaner butter or other flavor is achieved. Representative of the flavors and/or flavor enhancers will be sodium chloride; lactones; lipolyzed butter oils and starter distillates; diacetyl, 2-octanone, and other ketones; butyric acid, hexanoic acid, and other free fatty acids; esters of butyric acid, delta-hydroxy acids and their glycerol esters; and mixtures of any of these with other known dairy, buttery, or like flavors or flavor notes.

It is an advantage of the invention that the formulation of an outer phase containing flavors, particularly salt, provides good flavor impact with a minimum of ingredients. If flavor is in the gelled phase, as disclosed in previously described compositions, the product has less flavor. In the outer phase, flavors are available to the senses in a concentrated form. In this context, the salt content is quite low from the overall formulation standpoint, but gives a good salt impact like that achieved by conventional margarine having a 20% aqueous phase. Compositions of the invention prepared with lower salt concentrations is a desirable factor for consumers who must, for health reasons, decrease their salt consumption.

Moreover, use of relatively low salt contents not only can provide a clean, clear salt impact when it is maintained in the second, outer phase, but is also effective in this phase to assure preservation despite syneresis which results in water being released from the fat mimetic. The content of salt, e.g., sodium chloride, is preferably within the range of from about 5 to about 50%, preferably from about 10 to 35%, of the weight of the second, outer phase, and from about 1% to about 6% of the weight of the total composition.

The second, outer phase preferably contains a sufficient amount of a suitable heat-reversible or heat-thinning, water-soluble gelling agent (e.g., a mixture of xanthan and guar gums) to utilize syneresis from the inner phase and to provide some degree of melt or viscosity reduction when the butter substitute is applied to a hot food substrate. During this process, the outer phase becomes aqueous if it did not have water as a component in its original formulation. Because water leaching out of the inner phase is trapped by the outer phase, the overall syneresis of the product is controlled, and the resulting product comprises two aqueous phases.

The heat-reversible or heat-thinning, water-soluble gelling agent component of the second, outer phase can be any suitable food ingredient effective for this purpose. It will preferably be one or more hydrophilic colloids, e.g., one selected from the group consisting of gelatin, microcrystalline cellulose, carrageenin, guar gum, alginate, xanthan gum, methyl cellulose, carboxymethyl cellulose, ethyl cellulose, hydroxypropylmethyl cellulose, dextrins, starch, locust bean gum, soy protein isolate, pectin and the like, and mixtures of these. Xanthan gum also provides product cling, improving product performance on many substrates. Those gelling agents from the above list which tend to become cross-linked and form irreversible gels in the presence of divalent cations such as calcium, must be used with care to avoid setting them. The preferred gelling agents will provide a shear-thinning (i.e., dilatent) character as well as a melt character, the two properties together provide a mouthfeel reminiscent of melting fat. Xanman gum is particularly preferred in some embodiments to maintain viscosity and prevent water weeping from the surface.

It is an advantage of the invention that syneresis normally occurring when a gelled phase is stored for extended time periods (e.g., over one month, say from 2 to 6 months) is controlled by the use of the heat-reversible or heat-thinning, water-soluble gelling agent. Syneresis is normally a problem from an organoleptic standpoint and also from the standpoint of microbiological stability because water released from the fat mimetic can cause localized dilution which can challenge marginally-effective preservation systems. As described above, the present invention effectively controls the release of moisture from the gelled fat mimetic in the inner phase, even when the product is applied to a hot substrate. Any syneresis that occurs is utilized by the outer phase, so the overall product does not weep.

The second, outer phase will also preferably include dairy solids in a suitable form, such as milk, either as whole, skim, reconstituted dry milk, nonfat dry milk solids, butter milk, and the like including milk derivatives such as casein and whey, whey, cheese, sour cream, and yoghurt (any of these in whole, dried or reconstituted form). Sufficient milk will preferably be added to provide a milk solids content of from about 1 to about 15%, preferably from 2 to 5%, based of the total weight of the butter substitute composition. The principal function of the dairy solids is to provide flavor, and this can be achieved with good impact by adding it to the second, outer phase in small amounts.

The desired of the second, outer phase ingredients are then added to the mix tank 10 tank and mixing by means of the agitator 12 is continued until transfer via line 18 to an emulsion tank 20. The temperature in the mix tank 10 is held to at least about 175° F. during this operation and until transfer from the tank.

Following mixing and preferably holding to reduce the microbiological count, the mixture—now including all of the ingredients—is transferred from the mix tank to the emulsion tank 20 at a temperature of at least 175° F. A stream of the mixture is continuously withdrawn from the emulsion tank via line 22, passed through an in-line homogenizer 24 of the dairy type, set at a suitable pressure within the range of from about 500 to about 5000 psi, and any desired portion of it is recycled back to the emulsion tank via line 26. This procedure is carried out for about ten minutes at a flow rate sufficient to assure at least two theoretical passes of the composition through the homogenizer 24. The viscosity of the resulting hot product is preferably within the range of from about 3000 to about 8000±2000 centipoise at 160° F. as measured by a Brookfield viscometer (model RVT) with a number 5 spindle at 20 rpm, allowing four revolutions before reading. Upon cooling and holding for 24 hours the viscosity will increase to within the range of from about 9,000 to about 16,000 centipoise at 40° F. when measured with the same equipment. This is a result of the hydration of the gels added and thickening of the heat-reversible/heat-thinning gel on cooling. The difference between the two viscosity measurements is preferably within the range of from 3000 to 12000 centipoise.

As needed, the homogenized mixture is fed from the emulsion tank to the bottling apparatus where it is maintained at a temperature of at least 165° F. in tank until packaging via a suitable tub or bottle filling apparatus 40. A recycle line 42 is preferably provided in case there are interruptions in the packaging line. Following filling and sealing, the bottles are placed in a suitable shipping container such as a cardboard box.

Figure 2:
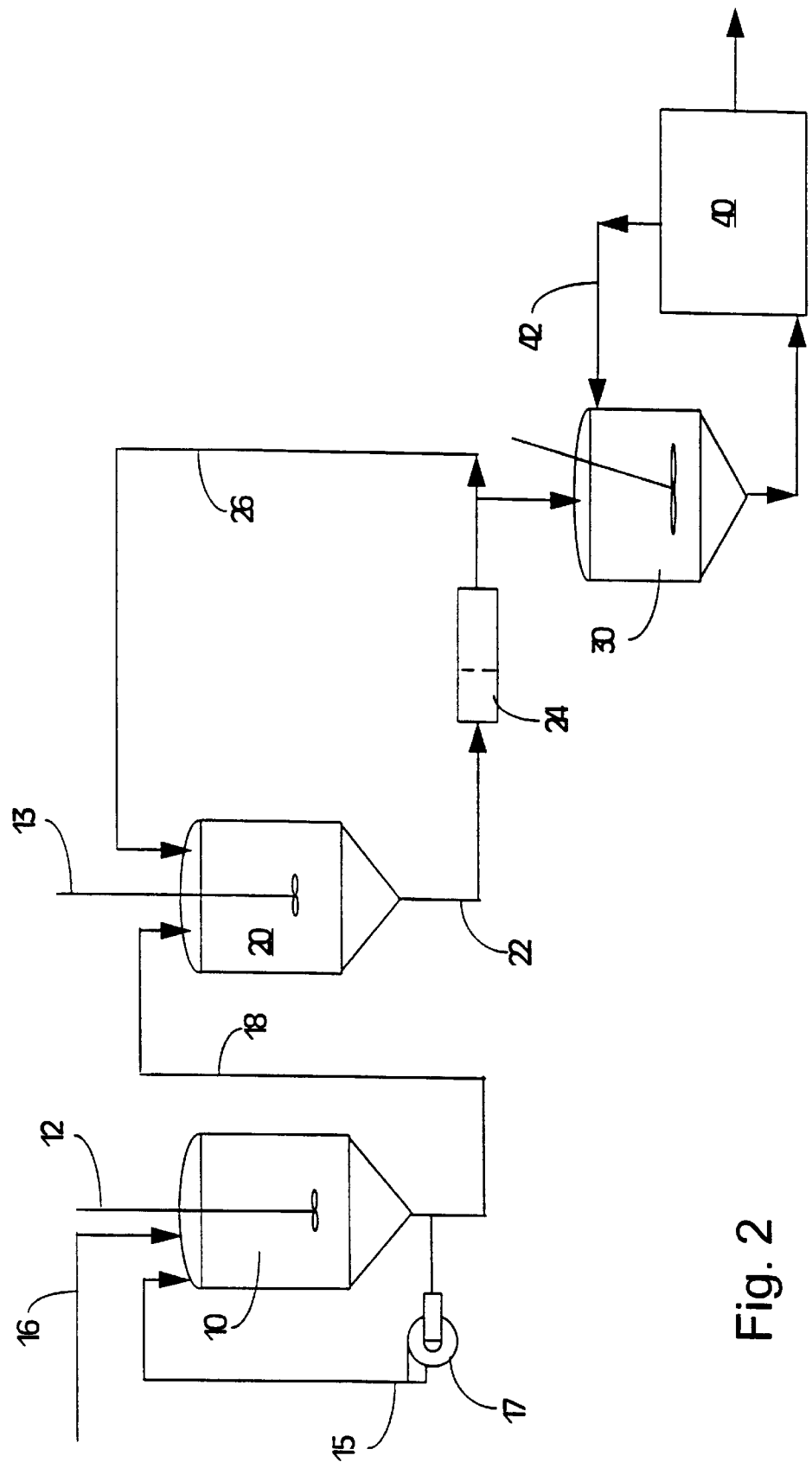
FIG. 2 is a schematic representation of an alternative embodiment.

In an alternative embodiment, shown in FIG. 2, the in-tank homogenizer 14 is eliminated, and a recycle line 15 and pump 17 are included. Also, it is important in this embodiment to assure constant mixing within the emulsion tank 20, and an agitator 13 is supplied for this purpose. In other respects, the equipment can be the same as in the embodiment of FIG. 1.

The invention thus provides a uniquely formulated product exhibiting a number of advantageous properties. The large proportion of a gelled non-thermally reversible, microparticulate particles in the inner aqueous phase provides a rich fat-like impression in the mouth when the product is consumed, without the use of any fat, yet the product is not pasty. Surrounding the inner phase is a proportionally smaller outer phase. Syneresis that occurs from the inner phase on storage or on application of the product to a hot substrate is taken up by the outer phase, which utilizes the water to hydrate gums, flavors, and other components. The syneresis of the overall product is thus controlled, so that it exhibits a good appearance and melting properties.

Instead of being dispersed throughout the product as in previously described spreads, salt and flavors are concentrated in the outer phase. In this respect, the outer phase is analogous to the (20%) aqueous phase of a margarine. The concentration provides maximal flavor impact when the product is consumed.

The product of the invention additionally exhibits advantageous microbiological stability. Because the particles in the inner phase never melt, preservative may be added to it to protect it from microbiological growth without affecting flavor of the overall product. The high salt content of the outer phase resists microbial growth in that phase, and protects the inner phase from contamination. Therefore, the product exhibits microbiological resistance and stability like that observed in a margarine, but without fat.

The invention also provides a process that is advantageously cost-effective. The particles in the inner phase remain small, so that the product can be hot-filled without losing consistency. This has the further advantage of removing the need for scraped-surface heat exchangers in production, which economizes costs.

EXAMPLES

The following Examples are provided to further illustrate and explain a preferred form of the invention and is not to be taken as limiting in any regard. Unless otherwise indicated, all parts and percentages are by weight, and are based on the weight at the particuular stage of processing being described.

Example 1

This example illustrates the preparation of a liquid, spread having a flavor and texture approximating butter and margarine, using a process arrangement as shown in FIG. 1 and employing the following formulation:

| Ingredient | Parts |
| --- | --- |
| Oil Premix | |
| Liquid corn oil | 2.50 |
| Butter flavor | 0.04 |
| Color (V&C Print) | 0.005 |
| Vitamin mix (Bakers W) | 0.0005 |
| Calcium Premix | |
| Water | 4.00 |
| Calcium lactate | 0.10 |
| Calcium chloride | 0.05 |
| First Phase Ingredients | |
| Water | 84.64 |
| Slendid ® pectin gel | 1.00 |
| Potassium sorbate | 0.33 |
| Lactic acid | 0.23 |
| Sodium benzoate | 0.10 |
| EDTA | 0.006 |
| Second Phase Ingredients | |
| Non-fat dried milk | 4.00 |
| Sodium chloride | 2.10 |
| Xanthan gum | 0.50 |
| Carrageenan | 0.40 |

As initial steps in the process, two premixes are prepared for later use to aid in the mixing of the ingredients—an "oil premix" and a "calcium premix", the ingredients of which are listed above. The mixing of each of these is straight forward, adding the liquid components first, followed by the solids.

The product is mixed in a 2000 gallon stainless steel mix tank (10 in FIG. 1) fitted with both an agitator (12) to maintain the tank ingredients in constant agitation and an Admix (Rotostat model) in-tank homogenizer (14) which is used to shear the pectin gel into irregular pieces in the tank as it is formed.

Initially, the water is heated to 180° F. and added to the mix tank. At this point the agitator is started and the the remaining first phase ingredients except pectin are added, i.e., EDTA, sorbate, benzoate, and lactic acid (to a titratable acidity of 0.20–0.35). At this point, the in-tank homogenizer is started and the pectin is added in dry form. The combined ingredients are then mixed for about eight minutes before adding the calcium premix. Following the addition of the calcium premix, the combined ingredients are continuously mixed by the in-tank homogenizer for about another seven minutes to create the non-thermally reversible inner gel, at the end of which time the mixture has the consistency of apple sauce.

The ingredients of the second outer phase are then added to the tank and mixing by means of the agitator is continued for another ten to thirty minutes until transfer to the emulsion tank (20). The temperature in the mix tank is held to at least about 175° F. during this operation and until transfer from the tank.

Following mixing, the mixture—now including all of the ingredients—is transferred from the mix tank to the emulsion tank (20) at a temperature of at least 175° F. A stream of the mixture is continuously withdrawn from the emulsion tank, passed through a Gaulin 2-stage homogenizer set at a pressure of 1500 psi, and recycled back to the emulsion tank. This procedure is carried out for about ten minutes at a flow rate of about 750 gallons per minute. The viscosity of the resulting hot product is about 6300±2700 centipoise at 160° F. as measured by a Brookfield viscometer (model RVT) with a number 5 spindle at 20 rpm, allowing four revolutions before reading. Upon cooling and holding for 24 hours the viscosity is in the range of from about 9,000 to about 16,000 at 40° F. when measured with the same equipment. The difference between the two viscosity measurements is at least 3000 centipoise.

As needed, the homogenized mixture is fed from the emulsion tank to a bottling apparatus where it is maintained at a temperature of at least 165° F. until packaging in recyclable polyethylene bottles is complete. Following filling and sealing, the bottles are placed in a shipping container and inverted.

Example 2

This example compares and contrasts liquid butter substitutes made according to a process of the invention with products prepared using other methods.

A product was prepared by combining an aqueous phase with a vitamin/color phase formulated from ingredients and proportions similar to those set out in Example 1:

| Ingredient | Parts |
| --- | --- |
| Vitamin/Color Premix | |
| Liquid corn oil | 2.50 |
| Butter flavor | 0.04 |
| Color (V&C Print) | 0.0051 |
| Vitamin mix (Bakers W) | 0.0005 |
| Balance of Mix: | |
| Water | 88.67 |
| Slendid ® pectin gel | 1.00 |
| Xanthan gum | 0.50 |
| Carageenan | 0.40 |
| NPDM | 4.00 |
| Sodium chloride | 2.10 |
| Potassium sorbate | 0.30 |
| Lactic acid | 0.23 |
| Calcium lactate | 0.10 |
| Calcium chloride | 0.05 |
| EDTA | 0.0057 |
| Sodium benzoate | 0.10 |

All the ingredients were hydrated together before setting in a process analogous to that described by Hoefler, et al., cited above. The product was lumpy, unhomogenous, pasty, and unacceptable, unlike the product of Example 1.

When this was repeated on a plant scale, all the ingredients except calcium were added to a tank. The pectin was then gelled by adding the calcium premix. The resulting product failed to develop any viscosity and had an unacceptable flavor and appearance.

A third product was made, again from ingredients in proportions identical to those set out above and similar to that in Example 1 above. In this instance, however, the process involved first hydrating the NFDM, salt, and gums, and then adding the mixture to the aqueous phase containing Slendid® in a process similar to that described by Fung, Fung, et al., and Campbell, et al., cited above. The product became too thick.

Example 3

Example 1 was repeated, except the oil component in the color/flavor/vitamin premix was replaced with 250 ppm of a water-dispersible β-carotene, and the oil replaced with water. The remaining process steps set out in Example 1 were repeated to yield a fat-free product having a consistency, appearance, and flavor like the product obtained in Example 1.

The above description is intended to enable the person skilled in the art to practice the invention. It is not intended to detail all of the possible modifications and variations which will become apparent to the skilled worker upon reading the description. It is intended, however, that all such modifications and variations be included within the scope of the invention which is defined by the following claims. The claims are meant to cover the indicated elements and steps in any arrangement or sequence which is effective to meet the objectives intended for the invention, unless the context specifically indicates the contrary.

We claim:

1. A process for preparing a butter substitute comprising:
    mixing a first gelling agent with an aqueous solution containing a cross-linkable carbohydrate gelling composition in an amount sufficient to cross-link the gelling composition and form a heat-stable gel;
    reducing the gel to produce a flowable, non-meltable, particulate, fat mimetic, first phase; and
    blending the first phase with a second phase that includes a second, unhydrated, heat-reversible or heat-thinning, water-soluble, gelling agent in an amount sufficient to control syneresis of the first phase, to provide a butter substitute exhibiting a perceivable melt quality when applied to a hot rood substrate without releasing water.

2. A process according to claim 1 wherein the butter substitute contains from about 75 wt. % to about 99 wt. % of the first phase and from about 25 wt. % to about 1 wt. % of the second phase, based on the weight of the butter substitute.

3. A process according to claim 2 wherein the second gelling agent is present in an amount sufficient to provide a viscosity increase of at least 3000 centipoise when the butter substitute is cooled from 160° F. to 40° F.

4. A process according to claim 2 wherein the second phase contains salt, butter flavor, dairy solids, vitamins, coloring ingredients, or mixtures thereof.

5. A process according to claim 4 wherein the second phase contains sufficient salt to provide the flavor and microstability of a margarine containing 8% fat.

6. A process according to claim 2 wherein the second gelling agent is xanthan gum.

7. A process according to claim 2 wherein the first gelling agent is calcium chloride.

8. A process according to claim 2 wherein the second phase contains up to 15 wt. % fat, based on the weight of the butter substitute.

9. A process according to claim 8 wherein the fat is a vegetable oil or animal fat.

10. A process according to claim 2 wherein the first phase contains a preservative.

11. A process according to claim 2 wherein the cross-linkable gelling composition is selected from the group consisting of pectins, pectates, alginates, agar-agar, konjac, gellan gum, kappa carrageenan, iota carrageenan, and mixtures of any of these.

12. A process according to claim 11 wherein the first gelling agent is a calcium salt.

13. A process according to claim 11 wherein the cross-linkable gelling composition is pectin.

14. A process for preparing a butter substitute having less than about 3% fat, comprising:
    mixing an aqueous solution containing pectin with a calcium salt gelling agent in an amount sufficient to cross-link the pectin, and a preservative, to form a heat stable gel;
    reducing the gel to form a flowable, non-meltable, particulate, fat mimetic, first phase; and
    blending the first phase with a second phase that includes salt, up to about 3% fat, and an unhydrated, heat-reversible or heat-thinning, water-soluble gelling agent, the gelling agent being present in an amount sufficient to provide a viscosity of 6300+/−2700 centipoise at 160° F. as measured by a Brookfield viscometer (model RVT) with a number 5 spindle at 20 rpm, allowing four revolutions before reading the viscometer, and a viscosity increase of at least 3000 centipoise when cooled to 40° F., to provide a butter substitute exhibiting a perceivable melt quality when applied to a hot food substrate without releasing water.

15. A process according to claim 14 wherein the butter substitute contains from about 75 wt. % to about 99 wt. % of the first phase and from about 25 wt. % to about 1 wt. % of the second phase, based on the weight of the butter substitute.

16. A process according to claim 15 wherein the second gelling agent is xanthan gum.

17. A process according to claim 15 wherein the calcium salt is calcium chloride and the preservative is calcium lactate.

18. A process according to claim 15 wherein the second phase contains salt, butter flavor, dairy solids, vitamins, coloring ingredients, or mixtures thereof.

19. A process according to claim 15 wherein the second phase contains sufficient salt to provide the flavor and microstability of a margarine containing 8% fat.

* * * * *